United States Patent [19]

Gundlach

[11] Patent Number: 4,698,910

[45] Date of Patent: Oct. 13, 1987

[54] SAFETY DEVICE FOR CLOTH CUTTING MACHINES

[75] Inventor: Joseph C. Gundlach, Oak Ridge, Tenn.

[73] Assignee: Acraloc Corporation, Oak Ridge, Tenn.

[21] Appl. No.: 773,345

[22] Filed: Sep. 6, 1985

[51] Int. Cl.[4] .............................................. B26B 7/00
[52] U.S. Cl. ................................ 30/275; 83/425 CC; 83/DIG. 1; 188/67
[58] Field of Search ................... 30/275; 83/145, 146, 83/925 CC, DIG. 1; 188/67, 161

[56] References Cited

U.S. PATENT DOCUMENTS 1,253,134 1/1918 Breining .............................. 30/275

Primary Examiner—Douglas D. Watts
Attorney, Agent, or Firm—Pitts and Brittian

[57] ABSTRACT

A safety device is provided for a cloth cutting machine having a motor driven cutting blade and a presser foot rod. The safety device (10) includes a housing (30) which in one embodiment serves as a magnetic concentrator. This housing (30) carries an electromagnet (40) which selectively activates a stopping mechanism (60) which secures the presser foot rod (16) at a selected location while the machine (12) is in operation. Upon termination of the cutting operation, the safety device (10) releases the presser foot rod (16) and allows the rod to slide under the force of gravity to its extended position such that the cutting blade (22) is shielded. In the preferred embodiment, a control circuit is provided for selectively energizing and de-energizing the electromagnet (40) which operates the stopping mechanism (60). This control mechanism releases the presser foot rod (16) upon termination of the machine operation.

12 Claims, 5 Drawing Figures

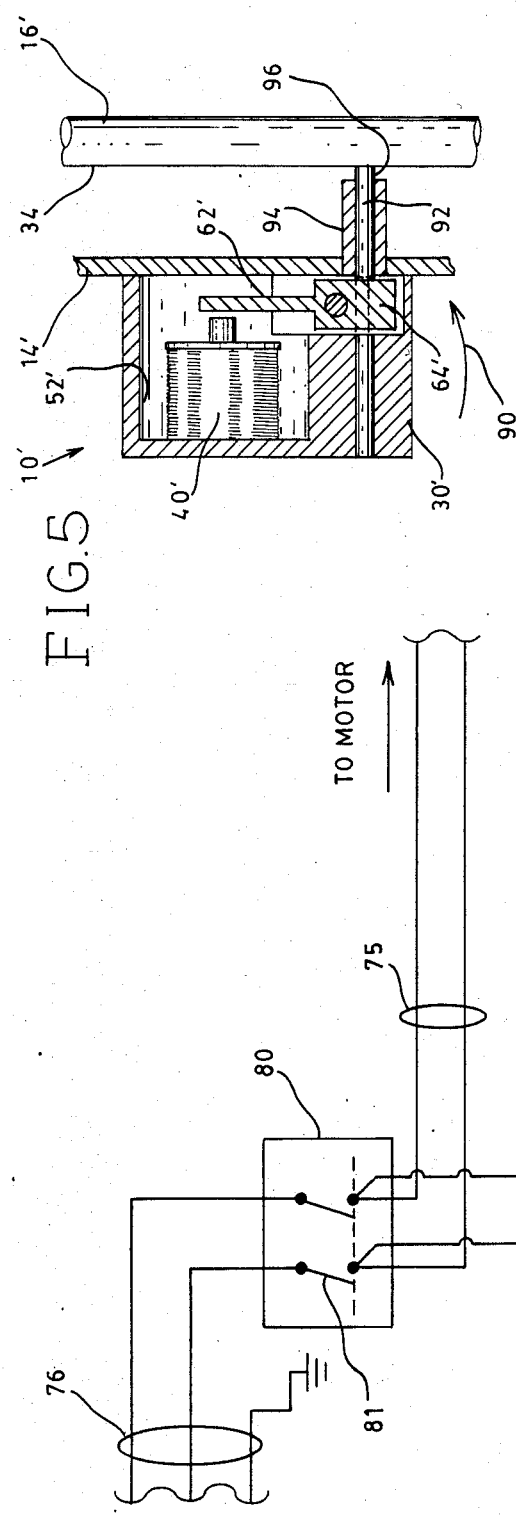
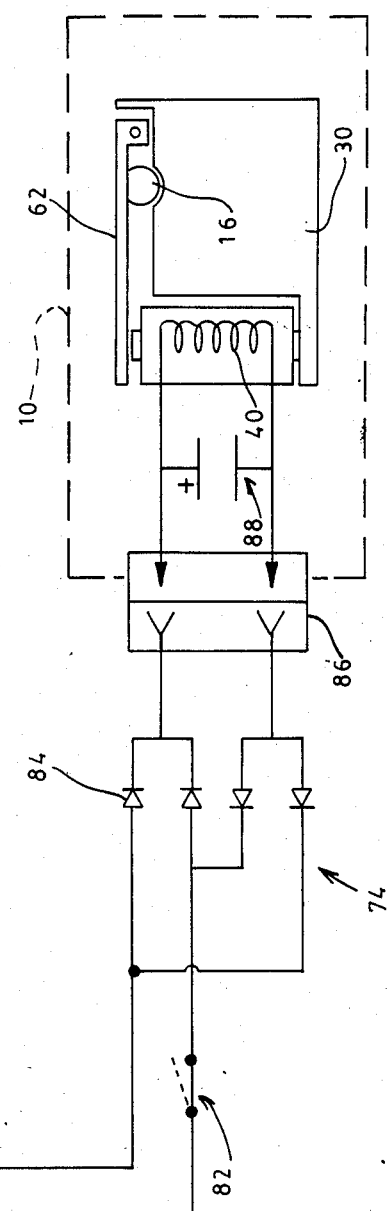
FIG. 5
FIG. 4

4,698,910

SAFETY DEVICE FOR CLOTH CUTTING MACHINES

DESCRIPTION

TECHNICAL FIELD

This invention relates generally to cloth cutting machines for having a reciprocating knife or cutting blade, and more particularly concerns a safety device which automatically secures the position of the presser foot rod at a selected location while the machine is in operation, and releases the rod such that the rod slides to a position to shield the knife while the cloth cutting machine is inoperative.

BACKGROUND ART

The presser foot holds the fabric or layers of cloth firmly while an automatic cloth cutting machine cuts through such cloth. The presser foot is conventionally carried at the end portion of a rod slidably mounted on or in the drive casing of the cloth cutting machine. When the machine is inoperative, it is desirable for the presser foot rod to slide to the its extended position, such that the sharp blade of the cloth cutting machine is shielded to assist in preventing inadvertent contact by the operator. A safety device incorporating features of the present invention can be readily mounted on a cloth cutting machine of the type generally described in U.S. Pat. No. 4,393,627.

Accordingly, it is an object of the present invention to provide a safety device which assists in shielding the cutting blade of an automatic cloth cutting machine while the machine is inoperative.

It is a further object of the present invention to provide such a safety device which secures the presser foot rod at a selected location during cutting operations, and which automatically releases the presser foot rod such that it can slide to its blade shielding position when the machine is not in use.

Another object of the present invention is to provide such a safety device which can be inexpensively manufactured and readily installed on new and existing cloth cutting machines to enhance the safety with which such machines are operated.

DISCLOSURE OF THE INVENTION

Other objects and advantages will be accomplished by the present invention which provides a safety device for a cloth cutting machine which serves to shield the cutting blade while the machine is inoperative. The safety device includes a housing which can serve as a magnetic concentrator. This housing carries an electromagnet which selectively activates a stopping mechanism which secures the presser foot rod at a selected location while the machine is in operation. Upon termination of the cutting operation, the safety device releases the presser foot rod and allows the rod to slide under the force of gravity to its extended position such that the cutting blade is shielded. In the preferred embodiment, a control circuit is provided for selectively energizing and de-energizing the electromagnet which operates the rod stopping mechanism. This control circuit releases the presser foot rod upon termination of the machine operation.

BRIEF DESCRIPTION OF THE DRAWINGS

The above-mentioned features of the present invention will be more clearly understood from consideration of the following description of the preferred embodiments read in conjunction with the accompanying drawings in which:

FIG. 4 is a schematic diagram of a control circuit used for operating the safety device illustrated in the above figures.

FIG. 5 is an alternate embodiment of a safety device which can be used in applications where the presser foot rod is mounted within the drive casing of the cloth cutting machine.

DESCRIPTION OF THE PREFERRED EMBODIMENT

Figure 1:
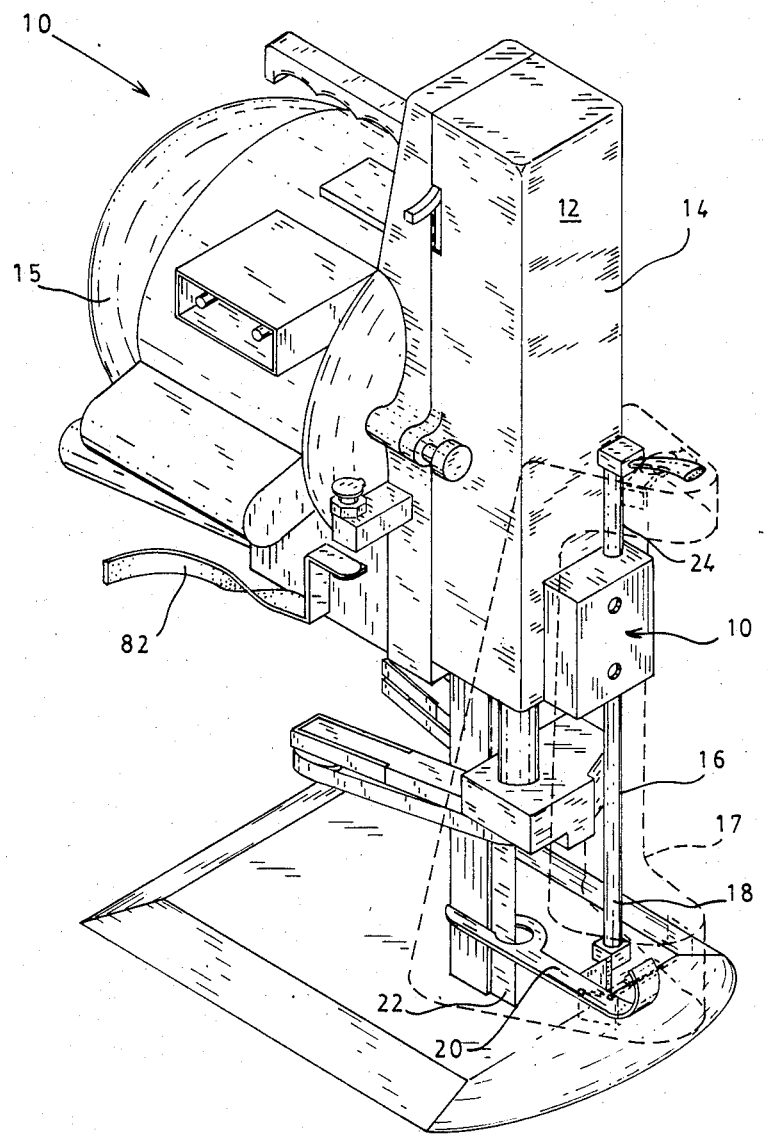
FIG. 1 is a perspective view of a cloth cutting machine incorporating a safety device constructed in accordance with various features of the present invention.

Referring now to the figures, a safety device constructed in accordance with the various features of the present invention is illustrated generally at 10 in FIG. 1. This device 10 is mounted on a conventional cloth cutting machine 12 which is driven by a motor such as the electrical motor 15 carried by the machine 12. This machine 12 includes a drive casing 14 which supports the device 10 proximate the forward portion of the machine 12. This device 10 in the embodiment depicted in FIG. 1 is operatively associated with a presser foot rod 16 which carries a safety guard 17 and which also carries at its lower most or outboard end portion 18 a presser foot 20. This presser foot 20 holds a top layer of cloth firmly down against the multiple layers during cutting operations. The presser foot is maintained in position by the presser foot rod 16 which lifts the presser foot to expose a portion of the cutting blade 22 during operation of the machine 12. It is desirable that, upon completion of the cutting operation, the presser foot rod slides to its extended position, such that the presser foot 20 engages the base of the machine. In this manner the sliding motion of the rod is terminated. With the presser foot rod 16 in its extended position, the sharpened cutting blade 22 will be sustantially shielded to assist in preventing bodily injury to an operator while the machine 12 is inoperative. While the safety device 10 and the operatively associated presser foot rod 16 are mounted outside the drive casing 14, an alternate embodiment described hereinafter will illustrate a safety device which serves to control the motion of the presser foot rod which is slidably mounted within this casing 14.

Figure 2:
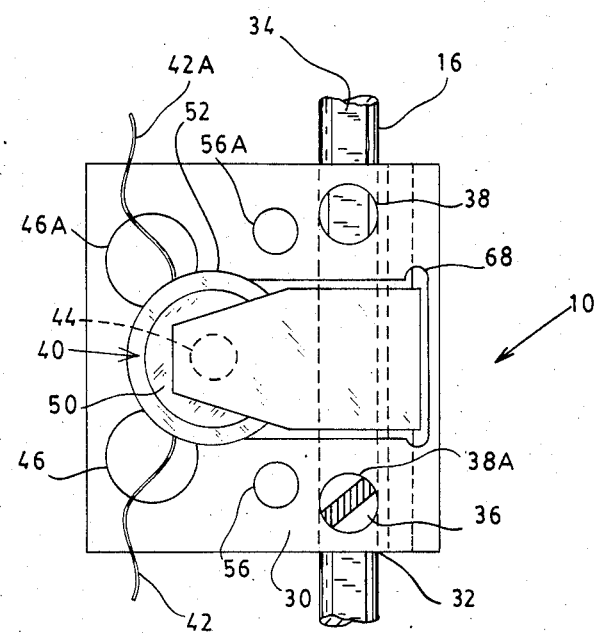
FIG. 2 is a plan view of the safety device shown in FIG. 1. It will be noted that this safety device includes a bore which slidably receives the presser foot rod therethrough.

The safety device 10 includes a housing 30 depicted in FIG. 2. This housing is preferably fabricated from a ferromagnetic material such as iron or the like which allows the housing to serve as a magentic concentrator, i.e., it controls the pattern of the flux lines generated by an electromagnet to be described hereinafter. As shown in FIG. 2, this housing 30 defines a rod bore 32 which slidably receives the presser foot rod 16. As depicted, this presser foot rod 16 includes a flat 34. Rotation preventing means such as a set screw 36 serves to prevent rotation of the rod 16 with respect to the housing 30. More specifically, the rotation preventing means are received within at least one of the bores such as the bores 38 and 38A. This bore, or bores as shown in FIG. 2, are disposed substantially perpendicular with respect to the axis of, and open into the bore 32 which slidably receives the rod 16 thereby allowing the distal end portion of the set screw to be positioned proximate the flat 34 on the rod 16. In this connection, rotation of the rod 16 is prohibited while its sliding motion is not impaired.

An electromagnet generally indicated at 40 is carried by the housing 30. This electromagnet is of substantially conventional design, and is supplied with power through the leads 42 and 42A illustrated in FIG. 2. Electromagnet 40 comprises a centrally positioned ferromagnetic rod 44 about which wire in to form a spool 50 is wrapped. As shown in FIG. 2, the wire leads 42 and 42A extend into the housing through the wire pockets 46 and 46A, respectively. The electromagnet 40 is secured in position by a suitable set screw or the like extending through the bore 48 depicted in FIG. 3. The screw extending through this bore will engage and secure the rod 44 (see FIG. 2) about which the wire terminating in leads 42 and 42A is wrapped. Thus, the electromagnet 40 is secured at a selected location within the housing and more specifically, in the recess 52 defined by the housing wall The bores 46 and 46A serve to receive suitable securing means such as the screws depicted in FIG. 1 for mounting the safety device 10 on the casing 14.

Figure 3:
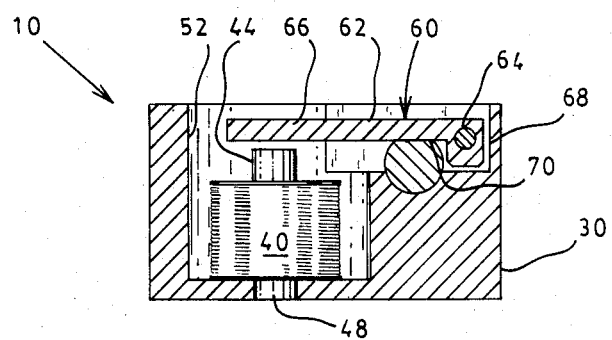
FIG. 3 is a sectional side elevation view of the safety device illustrated in FIG. 2.

Stop means generally indicated at 60 in FIG. 3 serve to stop the sliding motion of the presser rod 16 and secure the position of said rod during cutting operations. More specifically, the illustrated stop means 60 includes a flapper member 62 having a first end portion 64 which is pivotally mounted on the housing and positioned within the recess 68 of housing 30. The opposite end portion 66 of this flapper member 62 is positioned at a spaced location above the tip of the electromagnet rod 44 as illustrated in FIG. 3. Upon energization of the electromagnet 40, the end portion 66 of the flapper member, which is fabricated from at least a section of ferromagnetic material, is attracted to the electromagnet 40, or more specifically, the rod 44 of the electromagnet, thereby applying frictional force to the flat 34 of the rod as depicted in FIG. 3 at the location generally illustrated at 70. These frictional force serve to terminate the sliding motion of the presser foot rod 16. Thus, this presser foot rod motion is terminated by the application of the frictional force through the pivoted flapper member 62. It will be noted that the force applied at the location 70 in FIG. 3 will be several times the force generated by the electromagnetic attraction of the flapper member 62 to the electromagnet rod 44 due to the action of the lever arm. As necessary, or desired, this flapper member 62 can be balanced such that the mass on opposite sides of the location of the pivot are substantially equal. The embodiment described in connection with FIG. 5 illustrates this concept in greater detail.

Thus, energization of the electromagnet 40 causes the further end portion 66 of the flapper member 62 to be attracted to the electromagnet, and forces the flapper member 62 into frictional contact with the rod as illustrated in FIG. 3. This contact, which applies leveraged forces to the rod, serves to prevent sliding motion of the rod with respect to the housing 30, and thereby fixes the position of the presser foot rod and its operatively associated presser foot. When the electromagnet 40 is de-energized, the presser foot rod 16 is allowed to slide under gravitational forces until it is at its most extended position and in such position it substantially shields the sharpened cutting edge of the reciprocating cloth cutting blade 22.

The electromagnet 40 is selectively energized and de-energized by a control circuit generally indicated at 74 in FIG. 4. This control circuit is fed by a conventional AC outlet through the leads 76 which terminate in the junction box 80. These leads 76 are selectively connected with the drive motor 15 shown in FIG. 1 through leads 75 which also terminate in the junction box. It will be noted that the single throw, double pole switch 81, selectively connects the AC power source supplied through leads 76 with the motor through leads 75. The control circuit 74 is connected in parallel with the motor 15 fed through leads 75 as shown in FIG. 4. This circuit 74 is energized when the switch 81 is thrown. Thus, the motor 15 and the control circuit 74 are simultaneously energized and de-energized by an operator upon commencement of the cloth cutting operation. More specifically, the output of this junction box 80 is fed through switch 82 which is normally in a closed position. This switch 82 serves to enable the operator to adjust the position of the presser foot. More specifically, an operator can open this switch while the magnet 40 is energized and allow the presser foot to be positioned at a desired location, then close the switch 82 thereby securing the position of the presser foot until the switch 81 is thrown which simultaneously de-energized the motor 15 and the control circuit 74.

A full wave rectifier 84 serves to rectify the AC current fed into the circuits 74 through the leads 76. This rectifier 84 is connected through a conventional jack 86 to the electomagnetic 40 which is connected in parallel with the capacitor 88. This capacitor 88 assists in preventing the voltage across the electromagnet from reaching zero, which would release the flapper member 62 and cause it to oscillate. Thus, upon energization of the electromagnet 40, the flapper member 62 is drawn or attracted to the electromagnet as illustrated in FIG. 4, and thereby applies leveraged frictional and stopping forces to the presser foot rod 16. In the preferred embodiment, this control circuit 74 energizes the electromagnet automatically upon energization of the motor 15 and de-energizes the electromagnet 40 when the motor operation is terminated. Also, the switch 82 which would preferably comprise a conventional microswitch, can be used to selectively energize and de-energize the control circuit 74 to adjust the position at which the presser foot is stopped.

FIG. 5 depicts an alternate embodiment of a safety device 10' constructed in accordance with various features of the invention and in which the primed reference numerals refer to similarly constructed components of the device 10 illustrated in the previous figures. This safety device 10' includes a housing 30' having an electromagnet 40' carried in the recess 52'. The safety device 10' is particularly suitable for use in conjunction with a cutting machine in which the presser foot rod 16' is slidably mounted within the drive casing 14'.

In this embodiment, the housing 30' is secured to the external surface of the drive casing 14' and energization of the electromagnet 40' causes a pivoting motion of the flapper member 62' such that its end portion 64' is pivoted substantially in the direction of the arrow 90.

The safety device 10' is connected with the presser foot rod 16' through a push rod 92 which is slidably received within the bushing 94 extending through and secured on the drive casing 14' as illustrated. Upon energization of the electromagnet 40', the pivotal movement of the end portion 64' of the flapper member 62' pushes the push rod such that the outboard end portion 96 of the push rod frictionally engages the presser foot rod 16' thereby stopping its sliding motion and securing the position of the presser foot rod. Upon de-energization of the magnet 40' the flapper member 62' is released such that the frictional force applied through the push rod 92 to the presser foot rod 16' are terminated, thereby allowing the presser foot rod 16' to slide under gravitational forces to its extended position to shield the sharpened edge of the cutting blade 22.

From the foregoing detailed description, it will be recognized that a safety device for shielding the cutting edge of a reciprocating cutting blade, or the like, used in connection with a cloth cutting machine has been provided. More specifically, the safety device comprises an electromagnetic presser rod control device which secures the position of the presser foot rod when the cloth cutting machine is operated and releases the presser foot rod when the cloth cutting machine is inoperative such that the presser foot rod and the associated presser foot slide to their extended positions thereby shielding the sharpened cutting blade to assist in preventing bodily injury to an unattentive operator.

Thus, although the present invention has been described with respect to specific apparatus for enhancing the safe operation of an automatic cloth cutting machine having a sharpened cutting blade, the scope of the invention is limited only by the appended claims and the equivalents thereof.

I claim:

1. A safety device for a cloth cutting machine, such as a machine having a reciprocating blade, a drive motor to impart motion to said blade and a presser foot rod which carries a guard and which is slidably carried by a casing of said cloth cutting machine, said rod carrying a presser foot at its lower end portion which holds top layers of cloth firmly down against remaining multiple layers of cloth during cutting operations performed with said cloth layers, said safety device comprising;

a housing mounted on said casing of said cloth cutting machine;

an electromagnet carried by said housing, said electromagnet being being selectively energized;

stop means carried by said housing at a selected location, said stop means comprising a flapper member pivotally mounted in said housing and an end portion which includes at least a section which is ferromagnetic, said end portion being positioned at a selected location with respect to said electromagnet whereby energization of said electromagnet causes said end portion to be attracted by said electromagnet and pivots said flapper to produce frictional contact with said presser foot rod whereby said stop means serves to selectively stop and secure the position of said guard when said magnet is energized and serves to release said guard when said magnet is de-energized such that said guard slides to its extended position to shield said blade and to assist in preventing an operator from being cut by an exposed blade when said cloth cutting machine is not in operation.

2. The safety device of claim 1 wherein said housing is fabricated from a ferromagnetic material and serves as a magnetic concentrator.

3. The safety device of claim 1 wherein said presser foot rod is mounted on said casing and has a longitudinal flat surface and wherein said housing defines a rod bore therethrough which slidably receives said presser foot rod, and said housing further defines at least one further bore having an axis substantially perpendicular to the axis of said rod bore and opening into said rod bore at a selected location, and further comprises rotation preventing means which is received in said further bore for coacting with said flat surface for preventing the rotational movement of said rod with respect to said housing.

4. The safety device of claim 3 wherein said electromagnet forces said flapper into frictional contact with said flat surface of said presser foot rod whereby said flapper member stops the sliding motion of said rod and secures the position of said rod and said presser foot carried thereby.

5. The safety device of claim 1 including control circuit means for selectively energizing said electromagnet to secure the position of said presser foot rod during cutting operations and for selectively de-energizing said electromagnet to release said presser foot rod such that said rod will slide under the force of gravity to a position such that said guard shields said blade when said cloth cutting machine is inoperative, wherein said control circuit means is connected with said drive motor of said cloth cutting machine and supplies power to said electromagnet from a conventional AC source through a rectifier to energize said electromagnet, said control circuit means further including means for de-energizing said electromagnet.

6. The safety device of claim 1 wherein said stop means further comprises a push rod member slidably mounted in said housing, said push rod member having a first end portion which is positioned proximate said presser foot rod and a further end portion positioned proximate said flapper member whereby energization of said electromagnet causes said flapper member to act on said further end portion of said push rod and push said first end portion of said rod into contact with said presser foot rod thereby securing the position of said presser foot rod until said electromagnet is de-energized.

7. The flapper member of claim 1 wherein the mass of said member on opposite sides of the location at which said flapper member is pivoted is substantially balanced.

8. The flapper member of claim 6 wherein the mass of said member on opposite sides of the location at which said flapper member is pivoted is substantially balanced.

9. A safety device for a cloth cutting machine, such as a machine having a reciprocating blade, a drive motor to impart motion to said blade and a presser foot rod with a longitudinal flat surface which carries a guard and which is slidably mounted on a casing of said cloth cutting machine, said rod carrying a presser foot at its lower end portion which holds top layers of cloth firmly down against remaining multiple layers of cloth during cutting operations performed by moving said reciprocating blade into contact with said cloth layers, said safety device comprising:

a housing mounted on said casing of said cloth cutting machine, said housing being fabricated from a ferromagnetic material and serving as a magnetic concentrator and wherein said housing defines a rod bore therethrough which slidably receives said presser foot rod, and further defines at least one further bore having an axis substantially perpendicular to the axis of said rod bore and opening into said rod bore at a selected location, and rotation preventing means which is received in said further bore for coacting with said flat surface for preventing the rotational movement of said rod with respect to said housing;

an electromagnet carried by said housing, said magnet being selectively energized;

stop means carried by said housing at a selected location, said stop means comprising a flapper member having a first end portion pivotally mounted in said housing and a further end portion which includes at least a section which is ferromagnetic, said further end portion being positioned at a selected location with respect to said electromagnet whereby energization of said electromagnet causes said further end portion to be attracted by said electromagnet and forces said flapper into frictional contact with said flat surface of said presser foot rod whereby said stop means serves to selectively stop and secure the position of said presser foot rod when said magnet is energized and serves to release said guard when said magnet is de-energized such that said guard slides to its extended position to shield said blade and to assist in preventing an operator from being cut by an exposed blade when said cloth cutting machine is not in operation.

10. The safety device of claim 9 including control circuit means for selectively energizing said electromagnet to secure the position of said presser foot rod during cutting operations and for selectively de-energizing said electromagnet to release said presser foot rod such that said rod will slide under the force of gravity to a position such that said guard shields said blade when said cloth cutting machine is inoperative, wherein said control circuit means is connected with said drive motor of said cloth cutting machine and supplies power to said electromagnet from a conventional AC source through a rectifier to energize said magnet, and said control circuit means further including means for de-energizing said electromagnet.

11. The flapper member of claim 9 wherein the mass of said member on opposite sides of the location at which said flapper member is pivoted is substantially balanced.

12. A safety device for a cloth cutting machine, such as a machine having a reciprocating blade, a drive motor to impart motion to said blade and a presser foot rod which carries a guard and which is slidably mounted on a casing of said cloth cutting machine, said rod carrying a presser foot at its lower end portion which holds top layers of cloth firmly down against remaining multiple layers of cloth during cutting operations performed by moving said reciprocating blade into contact with said cloth layers, said safety device comprising:

a housing mounted on said casing of said cloth cutting machine, said housing being fabricated from a ferromagnetic material and serving as a magnetic concentrator and wherein said housing defines a rod bore therethrough which slidably receives said presser foot rod, and further defines at least one further bore having an axis substantially perpendicular to the axis of said rod bore and opening into said rod bore at a selected location, and rotation preventing means which is received in said further bore for preventing the rotational movement of said rod with respect to said housing;

an electromagnet carried by said housing said magnet being selectively energized;

stop means carried by said housing at a selected location, said stop means comprises a flapper member having a first end portion pivotally mounted on said housing and a further end portion which includes, at least a section which is ferromagnetic, said further end portion being positioned at a selected location with respect to said electromagnet whereby energization of said electromagnet causes said further end portion to be attracted by said electromagnet and forces said flapper into frictional contact with said rod whereby said member stops the sliding motion of said rod and secures the position of said rod and said presser foot carried thereby and wherein the mass of said member on opposite sides of the location at which said flapper member is pivoted is substantially balanced; and control circuit means connected in parallel with said driven motor of said cloth cutting machine and being operated simultaneously therewith for selectively energizing said electromagnet to secure the position of said presser foot rod during cutting operations and for selectively de-energizing said electromagnet to release said presser foot rod such that said guard will slide under the force of gravity to a position which shields said blade when said cloth cutting machine is inoperative.

* * * * *